US006714137B1

(12) United States Patent
Maxson et al.

(10) Patent No.: US 6,714,137 B1
(45) Date of Patent: Mar. 30, 2004

(54) PROTOCOL FOR AVOIDING INTERFERENCE BETWEEN TRANSMISSION DEVICE

(75) Inventors: Brian Dean Maxson, Riverside, CA (US); Adrian Hulse, Costa Mesa, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 0 days.

(21) Appl. No.: 09/535,263

(22) Filed: Mar. 23, 2000

(51) Int. Cl.[7] .................... G08C 19/00; G05B 19/02; H04N 5/44

(52) U.S. Cl. .................... 340/825.69; 340/825.64; 340/825.72; 340/825.24; 340/825.25; 348/734

(58) Field of Search .................... 340/825.69, 825.64, 340/825.72, 825.57, 825.6, 825.61, 825.62, 825.63, 825.65–825.68; 359/142; 370/493

(56) References Cited

U.S. PATENT DOCUMENTS 4,931,790 A 6/1990 Kobayashi et al. ......... 340/825
5,115,236 A * 5/1992 Kohler .................. 340/825.69
5,331,450 A 7/1994 Heep et al. ................. 359/135
5,455,570 A * 10/1995 Cook et al. ............ 340/825.72
5,525,976 A * 6/1996 Balgard ................. 340/825.64
5,740,542 A * 4/1998 Leeper et al. ............... 370/493
5,805,256 A 9/1998 Miller ........................ 348/734
5,815,086 A * 9/1998 Ivie et al. .............. 340/825.72
5,870,381 A * 2/1999 Kawasaki et al. .......... 370/213
6,160,491 A * 12/2000 Kitao et al. ............ 340/825.69
6,243,022 B1 * 6/2001 Furukawa .............. 340/825.69
6,496,927 B1 * 12/2002 McGrane et al. .............. 713/1

* cited by examiner

*Primary Examiner*—Brian Zimmerman
*Assistant Examiner*—Clara Yang
(74) *Attorney, Agent, or Firm*—Orrick, Herrington & Sutcliffe LLP

(57) ABSTRACT

Systems and methods for preventing signal jamming within a consumer electronics system comprising a remote control, interpreting device, and audio/video device. A plurality of primary messages are generated by, and wirelessly transmitted from, the remote control in response to a continuous operation of a remote function key. One or more quiescent periods are located between adjacent messages within the plurality of primary messages. The primary messages are received and interpreted by the interpreting device, which, in the preferred embodiment, is implemented as a television. The entirety of the one or more secondary messages are then transmitted from the interpreting device to the audio/video device during the one or more quiescent periods. In this manner, no portions of the primary and secondary messages are transmitted during the same time, preventing the signal jamming at the audio/video unit.

29 Claims, 8 Drawing Sheets

| TCDE1 (REMOTE CONTROL) | |
|---|---|
| DCDE1 | DKEY |
| 01101110 | VOL-DOWN (AUD-R) |
| 11010011 | VOL-UP (AUD-R) |
| 00111101 | CH-DOWN (AUD-R) |
| 11110101 | CH-UP (AUD-R) |
| 11101100 | VOL-DOWN (TV) |
| 11010111 | VOL-UP (TV) |
| 10111011 | CH-DOWN (TV) |
| 01110101 | CH-UP (TV) |

FIG. 7

| TCDE2 (TELEVISION) | | |
|---|---|---|
| DCDE1 | DKEY | DCDE2 |
| 01101110 | VOL-DOWN (AUD-R) | 0010101101011 |
| 11010011 | VOL-UP (AUD-R) | 1101101110110 |
| 00111101 | CH-DOWN (AUD-R) | 1110111011101 |
| 11110101 | CH-UP (AUD-R) | 1010101010111 |
| 11101100 | VOL-DOWN (TV) | NA |
| 11010111 | VOL-UP (TV) | NA |
| 10111011 | CH-DOWN (TV) | NA |
| 01110101 | CH-UP (TV) | NA |

FIG. 8

| TCDE3 (AUDIO/VIDEO DEVICE) | |
|---|---|
| DCDE2 | DKEY |
| 0010101101011 | VOL-DOWN (AUD-R) |
| 1101101110110 | VOL-UP (AUD-R) |
| 1110111011101 | CH-DOWN (AUD-R) |
| 1010101010111 | CH-UP (AUD-R) |

FIG. 9

PROTOCOL FOR AVOIDING INTERFERENCE BETWEEN TRANSMISSION DEVICE

FIELD OF THE INVENTION

This invention relates to the field of consumer electronics systems, and more particularly, to apparatus, methods, and systems for transmitting wireless signals within such consumer electronics systems.

BACKGROUND

There has been long-standing concern regarding the undesirable jamming of infrared (IR) signals transmitted within consumer electronics systems. Such IR jamming occurs when two or more transmitting devices simultaneously transmit IR signals that cannot be resolved at a receiving device. A typical scenario in which IR jamming may occur involves consumer electronics systems, such as home theater systems, wherein primary and secondary IR signals are transmitted between the components of the consumer electronics system.

For example, FIG. 1 depicts a prior art consumer electronics system 10, which generally includes a remote control 12, a television 14, and an audio/video device 16, e.g., an audio receiver, video cassette recorder (VCR), etc. The remote control 12 can be used to perform a variety of operations within the consumer electronics system 10. The performance of such operations within the consumer electronics system 10 may require different transmission protocols to be used, since typically, the individual components of a consumer electronics system are fabricated by different manufacturers. These differences, however, are transparent to the remote control 12, which utilizes the television 14 to communicate with other devices, including the audio/video device 16. This arrangement, however, is susceptible to IR jamming problems.

Although a jamming problem typically does not arise when the operation is performed within the television 14, the same cannot be said when the operation is performed within the audio/video device 16, since the remote control 12 communicates with the audio/video device 16 through the television 14, creating the possibility that two signals may be transmitted to the audio/video device 16. Specifically, an operation can be performed in the audio/video device 16 by depressing a corresponding remote function key 18 on the remote control 12. In response, a primary IR signal $S_{IR1}$ is transmitted to the television 14. The television 14 detects and interprets the primary IR signal $S_{IR1}$, and then transmits a corresponding secondary IR signal $S_{IR2}$ to the audio/video device 16, which, in the absence of IR interference, effects the performance of the operation in the audio/video device 16. If the audio/video device 16 is visible to the remote control 12, however, there is a chance that the audio/video device 16 will receive the primary IR signal $S_{IR1}$ as IR interference simultaneous with the secondary IR signal $S_{IR2}$. In this case, the primary IR signal $S_{IR1}$ acts as a jamming signal, thereby creating a jamming problem.

This jamming problem usually occurs when the remote function key 18 (e.g., the function key that controls volume-up or volume-down) is continuously depressed, creating a high likelihood that the remote control 12 will still be transmitting the primary IR signal $S_{IR1}$ during transmission of the secondary IR signal $S_{IR2}$ from the television 14. In this case, the remote control 12 does not gain control of the audio/video device 16 until the remote function key 18 is released, i.e., when the audio/video device 16 no longer receives the interfering primary IR signal $S_{IR1}$. Thus, this specific jamming problem creates the annoying situation where the user, anticipating that the continuous depression of the remote function key 18 will repeatedly perform the corresponding operation in the audio/video device 16, continuously depresses the remote function key 18 with no results. Only after the remote function key 18 is released is the corresponding operation performed, but only slightly. Thus, in order to repeatedly perform the operation within the audio/video device 16, the user is forced to repeatedly depress the remote function key 18, which may be an annoying task in itself.

This IR jamming phenomenon is illustrated in FIG. 2. Waveform 20 represents the continuous depression of the remote function key 18, remaining high as long as the corresponding remote function key 18 is depressed. Waveform 22 represents the primary IR signal $S_{IR1}$, which is transmitted from the remote control 12 in response to the depression of corresponding the remote function key 18. As can be seen, the primary IR signal $S_{IR1}$ is continuously transmitted in the form of a series of data blocks 28 for the duration that the corresponding remote function key 18 remains depressed. Waveform 24 represents the secondary IR signal $S_{IR2}$, which is transmitted from the television 14 in response to the detection and interpretation of the primary IR signal $S_{IR1}$. The secondary IR signal $S_{IR2}$ is continuously transmitted in the form of a series of data blocks 30 for the duration that the primary IR signal $S_{IR1}$ is received from the remote control 12. Waveform 26 represents the duration of the performance of the corresponding operation within the audio/video device 16, remaining low until the operation is performed. As can be seen, the operation is not performed until the transmission of the primary IR signal $S_{IR1}$ terminates, signifying the release of the corresponding function key 18. At this point, the audio/video device 16 is receiving only the secondary IR signal $S_{IR2}$, allowing the corresponding operation to be performed without significant IR interference. Such control is momentary, however, since the transmission of the secondary IR signal $S_{IR2}$ ceases when the primary IR signal $S_{IR1}$ is no longer detected.

Thus, there arises a need to prevent IR jamming in consumer electronics systems that utilize primary and secondary signals to effect the performance of an operation in response to a continuous remote function key press.

SUMMARY OF THE INVENTION

The present inventions comprise novel methods and systems for preventing such jamming. In accordance with a first aspect of the present inventions, signal jamming within a consumer electronics system is prevented by wirelessly transmitting a primary signal comprising first and second messages having a predetermined quiescent period therebetween. In the preferred embodiment, the first and second messages are identical and each comprises one or more data blocks. The present inventions, however, should not be limited to this implementation. The primary signal is received and interpreted, and a secondary signal is generated and wirelessly transmitted in response to the primary signal. In the preferred embodiment, the third message corresponds with the first message. For example, both the first message and third message comprise a command that the volume be turned up or down in a component of the consumer electronics system. The secondary signal includes a third message, the entirety of which is transmitted during the quiescent period. In this manner, no portion of the primary signal messages and no portion of the secondary messages is transmitted at the same time. The primary and secondary signals may be transmitted at any frequency, but preferably are transmitted at IR frequencies, as most consumer electronics devices wirelessly communicate with each other using IR frequencies.

In accordance with a second aspect of the present inventions, an interpreting device can be implemented in the consumer electronics system. The interpreting device includes a receiver for receiving the wirelessly transmitted primary signal. The interpreting device further includes processing circuitry for interpreting the first message and generating a third message in response thereto. This processing circuitry may be implemented as a microcomputer or microprocessor. The interpreting device further includes a transmitter for wirelessly transmitting the third message within the secondary signal in a manner such that the third message is transmitted during the quiescent period. In the case where the first and second messages are formatted in accordance with a first protocol, and the third. message is formatted in accordance with a second protocol different from the first protocol, the interpreting device may be advantageously used as the interface between the device that transmitted the primary signal and the device that is to receive the secondary signal.

In accordance with a third aspect of the present inventions, signal jamming is prevented within a consumer electronics system having a remote control, an interpreting device, and an audio/video device. In the preferred embodiment, the interpreting device is implemented as a television. The interpreting device, however, can be any device that can receive and interpret a first signal, and then generate and transmit a second signal in response to the first signal. The audio/video device can be any device that provides audio, video, or both to a user, e.g., an audio processor, CD player, VCR, etc. In the method, the signal jamming is prevented even if a remote function key on the remote control is continuously operated. In response to such remote function key operation, a plurality of primary messages is wirelessly transmitted from the remote control, where each of one or more quiescent periods are located between the adjacent messages of the plurality of primary messages. The plurality of primary messages may be formatted in data blocks and may be identical to each other. The present inventions, however, should not be limited to such an implementation. The primary messages are then received at the interpreting device and interpreted. In response to the interpretation of the primary messages, one or more secondary messages are generated and wirelessly transmitted from the interpreting device to the audio/video device entirely during the one or more quiescent periods. The one or more secondary messages are preferably based on the interpreted plurality of primary messages, but the present inventions should not be so limited. To ensure that interference between the primary and secondary messages does not occur, each quiescent period is at least equal to the sum of the period of silence needed for the interpreting device to detect one of the plurality of primary messages, the duration of one of the one or more secondary messages, and the period of silence needed for the audio/video device to detect one of the one or more secondary messages.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which:

FIG. 7 is a code table stored in the memory of the remote control of FIG. 4;

FIG. 8 is a code table stored in the memory of the interpreting device of FIG. 5;

FIG. 9 is a code table stored in the memory of the interpreting device of FIG. 6;

DETAILED DESCRIPTION OF THE PREFERRED EMBODIMENTS

Figure 1:
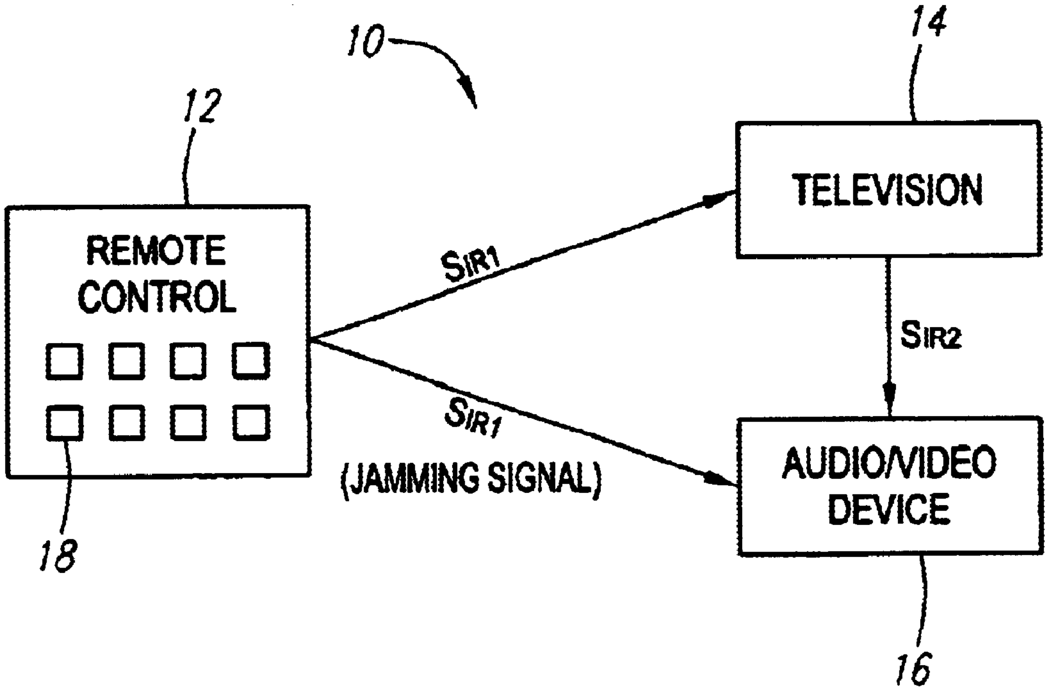
FIG. 1 (PRIOR ART)
FIG. 1 is a schematic drawing of a prior art embodiment of a consumer electronics system.
Figure 2:
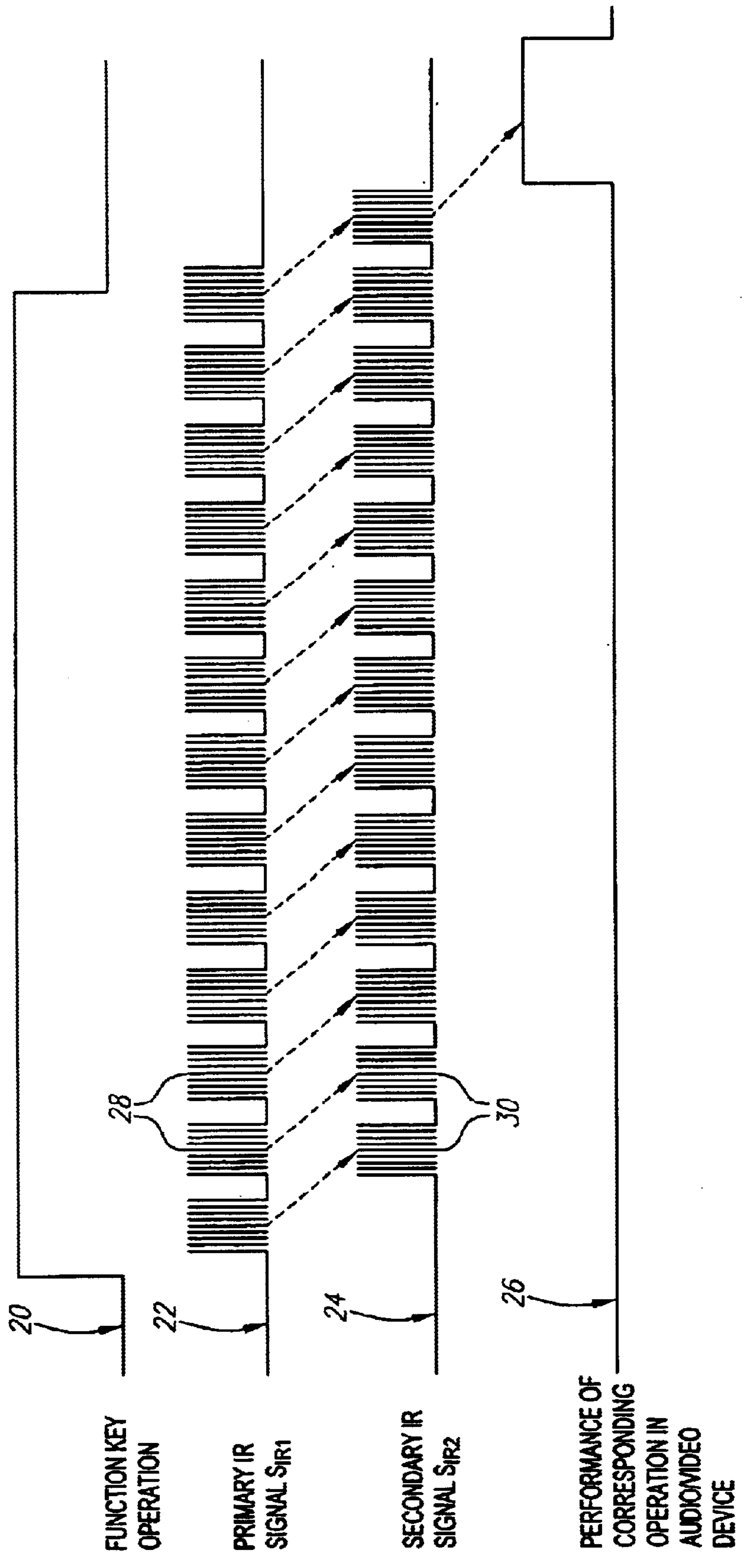
FIG. 2 (PRIOR ART)
FIG. 2 is a timing diagram illustrating an IR jamming phenomenon in the consumer electronics system of FIG. 1.
Figure 3:
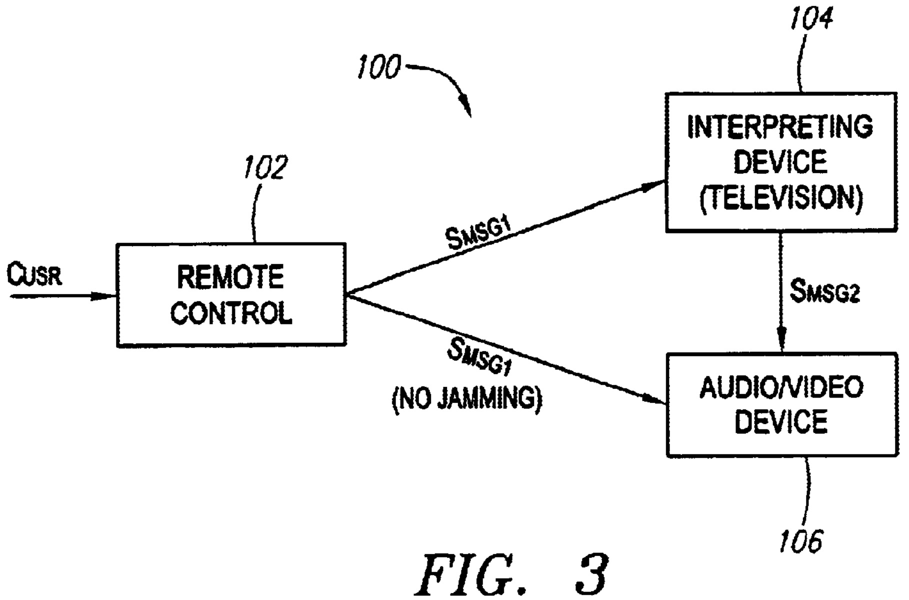
FIG. 3 is a preferred embodiment of a consumer electronics system constructed in accordance with the present inventions.

FIG. 3 shows a schematic representation of a consumer electronics system 100 constructed in accordance with a preferred embodiment of the present inventions. The consumer electronics system 100 generally comprises a remote control 102, an interpreting device 104, and an audio/video device 106. The remote control 102 provides the interface through which a user may enter a user command $C_{USR}$ for the purposes of performing an operation within the consumer electronics system 100. In response to the user command $C_{USR}$, the remote control 102 wirelessly transmits a primary signal $S_{MSG1}$ to the interpreting device 104. The interpreting device 104 provides the means for interpreting the primary signal $S_{MSG1}$, and wirelessly transmitting a secondary signal $S_{MSG2}$ to the audio/video device 106. The secondary signal $S_{MSG2}$ corresponds to the primary signal $S_{MSG1}$ and is processed by the audio/video device 106 to perform the operation corresponding to the user command $C_{USR}$. Thus, the interpreting device 104 can be advantageously used to translate a signal between two different protocols, which often exist in consumer electronics systems composed of devices sold by different manufacturers. In the illustrated embodiment, the interpreting device 104 keeps track of the state in which the system 100 is in. In this manner, the remote control 102 can be made more simple, such as, e.g., removing the component selection switch that is otherwise found in typical remote controls. In this respect, the interpreting device 104 can wirelessly transmit a plurality of secondary signals to a variety of components based on the operation of a single function key on the remote control. For example, a "Dub tape to tape" can be located on the remote control 102, the depression of which sends a single unique primary signal to the interpreting device 104, which in turn, sends a plurality of secondary signals to a variety of components to effect the dubbing of a tape. For example, a secondary signal can be issued to a first VCR to begin playing, a second VCR to begin recording, and an AV receiver to switch its connections between the VCR's.

As shown in FIG. 3, the remote control 102 may coincidentally transmit the primary signal $S_{MSG1}$ to the audio/video device 106. Thus, if the primary signal $S_{MSG1}$ is prolonged, e.g., if a function key on the remote control 102 is continuously operated, it is entirely possible for the audio/video device 106 to receive both the primary signal $S_{MSG1}$ and secondary signal $S_{MSG2}$ during the same time frame. As will be described in further detail below, however, the consumer electronics system 100 provides a means for preventing the primary signal $S_{MSG1}$ from interfering with the receipt and interpretation of the secondary signal $S_{MSG2}$ at the audio/video device 106, eliminating any jamming problem that may otherwise arise.

Figure 4:
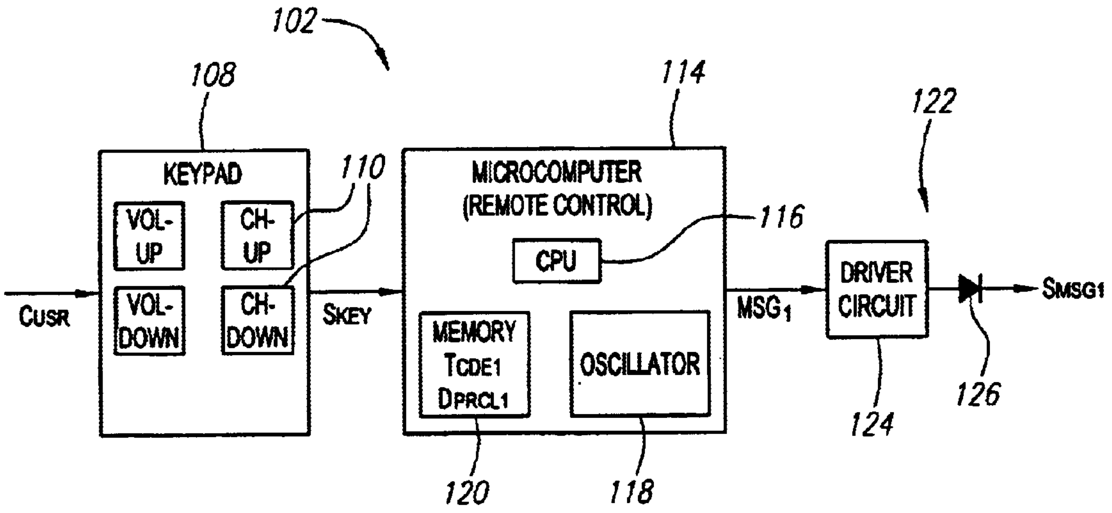
FIG. 4 is a preferred embodiment of a remote control used in the consumer electronics system of FIG. 3.

Referring to FIG. 4, the particular features of the remote control 102 are described. The remote control 102 includes a keypad 108, which provides a means for issuing a user command $C_{USR}$ that effects any one of variety of operations within the consumer electronics system 100. For the purposes of this specification, the performance of an operation is any act that modifies a function of any component within the consumer electronics system 100, e.g., volume-up, volume-down, channel-up, channel-down, etc. In this regard, the keypad 108 includes a multitude of remote function keys 110, the operation of each corresponding to a particular operation that can be performed in the consumer electronics system 100. In response to the issuance of the user command $C_{USR}$ through one of the remote function keys 110, the keypad 108 generates and outputs a keypad signal $S_{KEY}$. As is typical in most remote controls, the keypad 108 is arranged in a matrix of key positions, wherein the depression of a function key generates a high signal on the associated address circuitry corresponding to the key position. Thus, in the illustrated embodiment, the keypad signal $S_{KEY}$ is represented by a high signal on a matrix indicative of the depressed function key. Of course, circuitry within the remote control 102 can be configured in any manner that effects the functionalities thereof.

The remote control 102 generally includes a processing circuit 114, which, in the illustrated embodiment, is implemented as a microprocessor or microcomputer. While an integrated device is preferable, any analog or digital system, discrete or integrated, or combinations thereof may be utilized if the functionalities of the invention may be achieved. The microcomputer 114 comprises a central processing unit (CPU) 116, an oscillator 118 for internal timing, and memory 120 for storing a code table $T_{CDE1}$, and protocol data $D_{PRCL1}$ As shown in FIG. 7, the code table $T_{CDE1}$ includes a set of code data $D_{CDE1}$ and a corresponding set of keypress data $D_{KEY}$. In the illustrated embodiment, the set of code data $D_{CDE1}$ includes a list of pulse code bit patterns used to carry out corresponding operations within the consumer electronics system 100. For example, the pulse code bit pattern 01101110 corresponds to the VOL-DOWN function key for an audio receiver. It should be noted that the keypress data $D_{KEY}$ is not actually stored in the code table $T_{CDE1}$ as textual information, but rather as a code indicative of an operated remote function key. For purposes of illustration, however, the keypress data $D_{KEY}$ is depicted in FIG. 7 as textual information. The protocol data $D_{PRCL1}$ is used to format the code data $D_{CDE1}$ into a data block. Such protocol data may include the basic format of the data block, such as the bit timing, number of bits per word, width of the pulses, modulating frequency, if any, applied to each pulse, and the presence and format of start, lead, or trailer pulses. As will be described in further detail below, the particular code data $D_{CDE1}$ and protocol data $D_{PRCL1}$ stored in the memory 120 is defined by the manufacturer of the remote control 102 and interpreting device 104.

Referring further to FIG. 4, the microcomputer 114 is coupled to the keypad 108 and generates a primary message $MSG_1$, in response to the keypad signal $S_{KEY}$ Specifically, when one of the remote function keys 110 is depressed, the microcomputer 114 performs a keyscan operation to determine which of the remote function keys 110 was depressed. Upon ascertaining the depressed function key 18, the microcomputer 114 looks up the keypress data $D_{KEY}$ in the code table $T_{CDE1}$ and obtains the corresponding code data $D_{CDE1}$ The microcomputer 114 then constructs the primary message $MSG_1$ from the obtained code data $D_{CDE1}$ in accordance with the protocol data $D_{PRCL1}$. A message will be defined, for the purposes of this specification, as the entirety of the information generated in response to a non-continuous operation of a function key 18. In the illustrated embodiment, the primary message $MSG_1$ takes the form of two identical data blocks (see FIG. 10), with the second identical data block providing confirmation for the first identical data block. It should be noted, however, that for the purposes of the present invention, the primary message $MSG_1$ may include a single data block or any number of identical data blocks.

Figure 10:
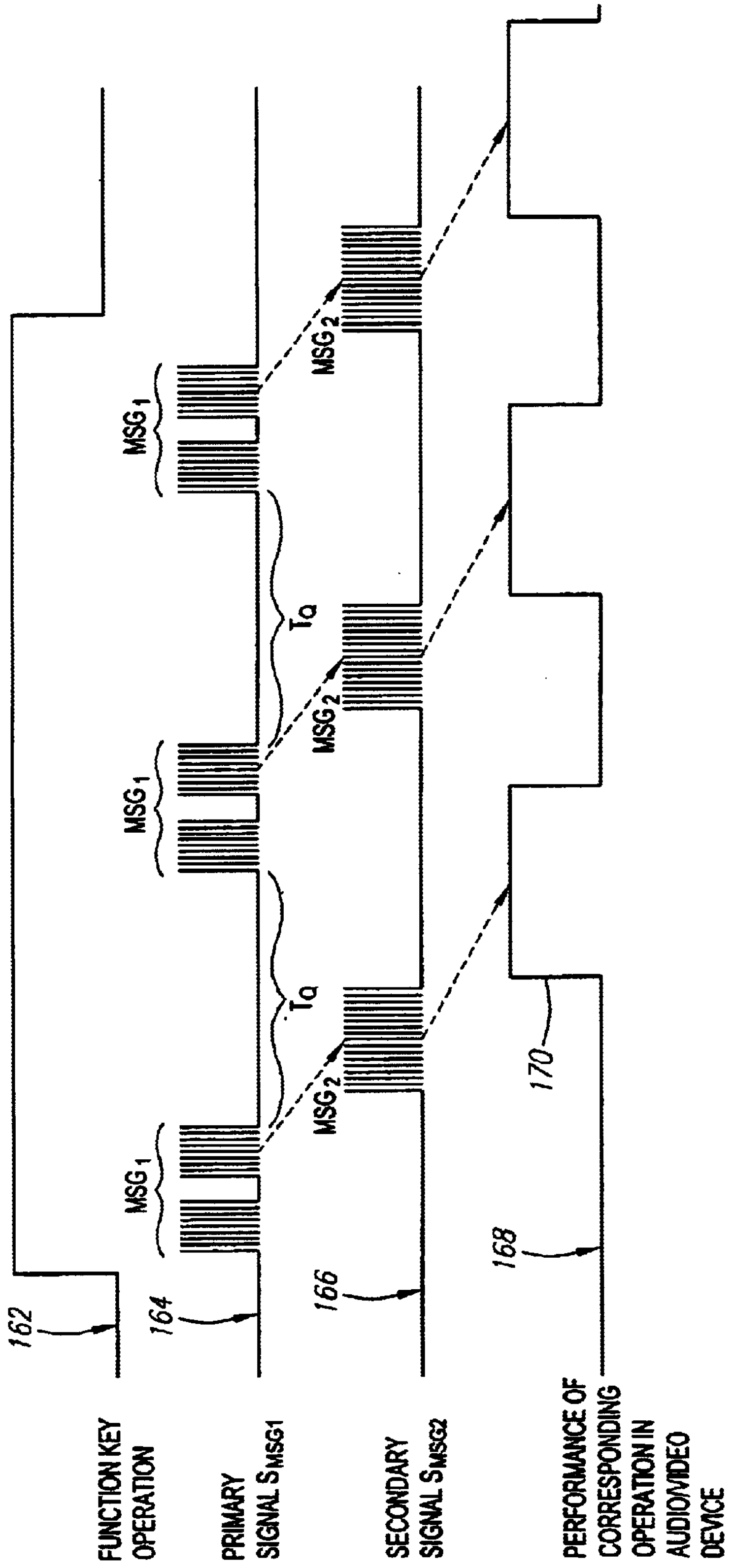
FIG. 10 is a timing diagram illustrating the continuous operation of a remote function key, transmission of primary and secondary signals, and performance of an operation within the audio/video device, wherein signal jamming is avoided.

As will be discussed in further detail below, the microcomputer 114 will construct several primary messages $MSG_1$ when the function key 18 is continuously operated, advantageously locating quiescent periods between adjacent primary messages $MSG_1$ (see FIG. 10). Such an arrangement allows time for the interpreting device to generate and transmit the secondary signal $S_{MSG2}$ to the audio/video device 106 without interference from the primary signal $S_{MSG1}$.

The remote control 102 also includes an infrared (IR) transmitter 122 coupled to the output of the microcomputer 114. The IR transmitter 122 wirelessly transmits the primary message $MSG_1$ output from the microcomputer 114 as the primary signal $S_{MSG1}$. To accomplish this, the IR transmitter 122 includes a driver circuit 124 for amplifying the primary signal $S_{MSG1}$ to a suitable level for wireless transmission, and an IR light emitting diode (LED) 126 for wirelessly transmitting the primary signal $S_{MSG1}$ Preferably, the primary signal $S_{MSG1}$ is transmitted at a frequency typical for most consumer electronics systems, e.g., 40 KHz. The primary signal $S_{MSG1}$, however, can be transmitted at any frequency conducive to providing communication within the consumer electronics system 100.

Figure 5:
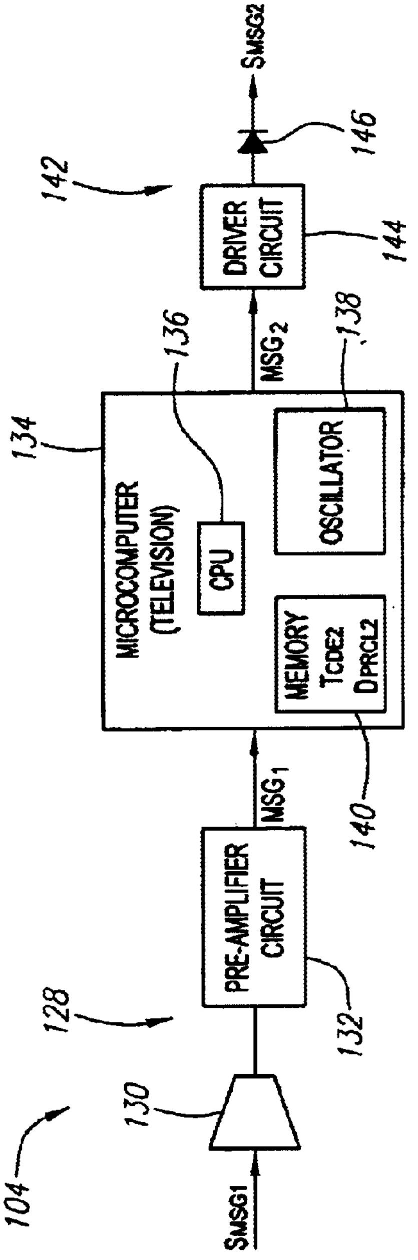
FIG. 5 is a preferred embodiment of an interpreting device used in the consumer electronics system of FIG. 3.

Referring to FIG. 5, the particular features of the interpreting device 104 are described. In the illustrated embodiment, the interpreting device 104 is implemented as a television 104. The employment of a preexisting device, such as a television, provides an efficient means of providing the consumer electronics system 100 with.this signal interpreting capability. It should be noted that for purposes of the present invention, however, that the interpreting device 104 should not be limited to a television; but can take the form of any device able to receive a signal, interpret it, and issue a corresponding signal in response thereto.

Besides including features that are found in all televisions (e.g., tuner, CRT, screen, etc.), the television 104 includes an IR receiver 128 for receiving the primary signal $S_{MSG1}$ wirelessly transmitted from the IR transmitter 122 of the remote control 102, and obtaining the primary message $MSG_1$ therefrom. To accomplish this, the IR receiver 128 includes an IR sensor 130 for sensing the primary signal $S_{MSG1}$, and a pre-amplifier circuit 132 for amplifying the primary signal $S_{MSG1}$ to a level suitable for coherently obtaining the primary message $MSG_1$ therefrom.

The television 104 further includes a processing circuit 134, which, in the illustrated embodiment, is implemented as a microprocessor or microcomputer. Again, the processing circuit 134 should not be limited to an integral device, but can be implemented as any analog or digital system, discrete or integrated, or combinations thereof. Like the microcomputer 114 described above, the microcomputer 134 comprises a CPU 136, an oscillator 138 for internal timing, and memory 140 for storing a code table $T_{CDE2}$ and protocol data $D_{PRCL2}$. As shown in FIG. 8, the code table $T_{CDE2}$ includes a first set of code data $D_{CDE1}$ and a corresponding set of keypress data $D_{KEY}$, which are identical to the sets of code data $D_{CDE1}$ and keypress data $D_{KEY}$ stored in the memory 120 of the remote control 102. The code table $T_{CDE2}$ further includes a second set of code data $D_{CDE2}$, which corresponds to the first set of code data $D_{CDE1}$, and thus, the keypress data $D_{KEY}$, the difference being that the second set of code data $D_{CDE2}$ is defined by the manufacturer of the audio/video device 106. For example, the pulse code bit pattern 0010101101011 corresponds with the pulse code bit pattern 01101110, which in turn corresponds to the volume-down function key 18 for the audio/video device 106. Only the code data $D_{CDE2}$ that is used to perform operations in the audio/video device 106 are stored in the code table. For example, there is no code data $D_{CDE2}$ corresponding to any operations for the television 104. In this case, the manufacturers of the television 104 and the audio/video device 106 are different. If the manufacturers of the television 104 and the audio/video device 106 are the same, however, the second set of code data $D_{CDE2}$ may not exist or may be duplicative of the first set of code data $D_{CDE1}$. The protocol data $D_{PRCL2}$ is used to format the code data $D_{CDE2}$ into a data block. The particular protocol data $D_{PRCL2}$ stored in the memory 140 is defined by the manufacturer of the audio/video device 106. It should be noted that the code table $T_{CDE2}$ can be programmed with the second set of code data $DCDE_2$ using means well known in the art.

Referring back to FIG. 5, the microcomputer 134 is coupled to the output of the IR receiver 128 and detects the primary message $MSG_1$ output from the IR receiver 128 by determining whether the primary message $MSG_1$ is a valid message transmitted by the remote control or merely IR interference. Specifically, if microcomputer 134 detects that the primary message $MSG_1$ includes two identical valid data blocks, the microcomputer 134 considers the primary message $MSG_1$ to be valid. In contrast, if the microcomputer 134 detects that the two data blocks of the primary message $MSG_1$ are not identical, or if the second data block does not exist, the microcomputer 134 ignores the primary message $MSG_1$.

Assuming that the detected primary message $MSG_1$ is valid, the microcomputer 134 either effects an operation within the television 104 or generates a secondary message $MSG_2$. Specifically, upon obtaining the code data $DCDE_1$ from the primary message $MSGC_1$, the microcomputer 134 looks up the code data $D_{CDE1}$ in the code table $T_{CDE2}$, and obtains the corresponding keypress data $D_{KEY}$. If the operation corresponding to the keypress data $D_{KEY}$ is a television operation, the microcomputer 134 outputs a command to effect the performance of this operation. If the operation corresponding to the keypress data $D_{KEY}$ is an audio/video device operation, the microcomputer 134 obtains the code data $D_{CDE2}$ corresponding to the keypress data $D_{KEY}$. The microcomputer 134 then constructs the secondary message $MSG_2$ from the obtained code data $D_{CDE2}$ in accordance with the protocol data $D_{PRCL2}$ In the illustrated embodiment, the secondary message $MSG_2$ takes the form of a single data block (see FIG. 10). It should be noted, however, that for purposes of the present invention, the secondary message $MSG_2$ may include any number of identical data blocks. As will be described in further detail below, the secondary message $MSG_2$ is transmitted during the quiescent period defined by the remote control 102.

The television 104 also includes an infrared (IR) transmitter 142 coupled to the output of the microcomputer 134. The IR transmitter 142 wirelessly transmits the secondary message $MSG_2$ output from the microcomputer 134 as the secondary signal $S_{MSG2}$. To accomplish this, the IR transmitter 142 includes a driver circuit 144 for amplifying the secondary signal $S_{MSG2}$ to a suitable level for wireless transmission, and an IR LED 146 for wirelessly transmitting the secondary'signal $S_{MSG2}$. For purposes of cost efficiency, the secondary signal $S_{MSG2}$ is transmitted at the same frequency as the primary signal $S_{MSG1}$, e.g., 40 KHz.

Figure 6:
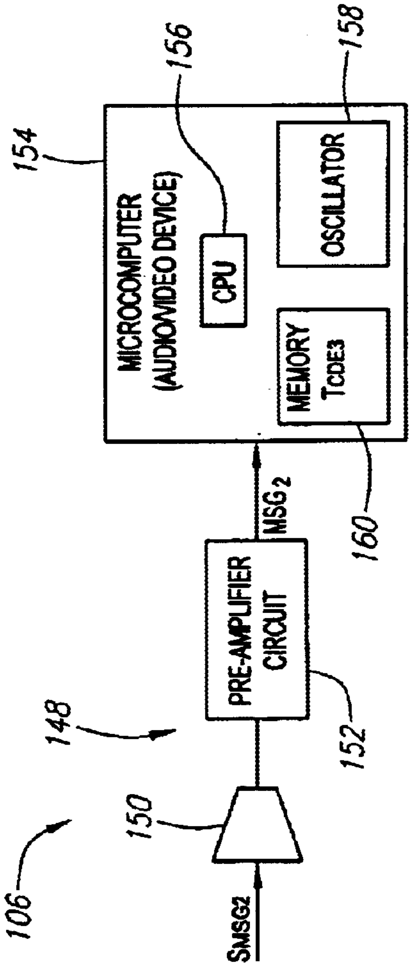
FIG. 6 is a preferred embodiment of an audio/video device used in the consumer electronics system of FIG. 3.

Referring to FIG. 6, the particular features of the audio/video device 106 are described. The audio/video device 106 can take the form of any device that provides audio, video or both to a user, e.g., an audio receiver, a video cassette recorder (VCR), a compact disc player, etc. The audio/video device 106 includes an IR receiver 142 for receiving the secondary signal $S_{MSG2}$ wirelessly transmitted from the IR transmitter 142 of the television 104, and obtaining the secondary message $MSG_2$ therefrom. To accomplish this, the IR receiver 148 includes an IR sensor 150 for sensing the secondary signal $S_{MSG2}$ , and a pre-amplifier circuit 152 for amplifying the secondary signal $S_{MSG2}$ to a level suitable for coherently obtaining the secondary message $MSG_2$ therefrom.

The audio/video device 106 further includes a processing circuit 154, which, in the illustrated embodiment, is implemented as a microprocessor or microcomputer. Again, the processing circuit 154 should not be limited to an integral device, but can be implemented as any analog or digital system, discrete or integrated, or combinations thereof. Like the microcomputers 114 and 134 described above, the microcomputer 154 comprises a central processing unit 156, an oscillator 158 for internal timing, and memory 160 for storing a code table $T_{CDE3}$. As shown in FIG. 9, the code table $T_{CDE3}$ includes a set of code data $D_{CDE2}$ and a set of keypress data $D_{KEY}$, which are identical to the sets of code data $D_{CDE2}$ and keypress data $D_{KEY}$ stored in the memory 140 of the television 104.

Referring back to FIG. 6, the microcomputer 134 is coupled to the output of the IR receiver 148 and effects an operation within the audio/video device 106 in response to the secondary message $MSG_2$ output from the IR receiver 148. Specifically, upon obtaining the code data $D_{CDE2}$ from the secondary message $MSG_2$, the microcomputer 114 looks up the code data $D_{CDE2}$ in the code table $T_{CDE3}$ , and obtains the corresponding keypress data $D_{KEY}$. The microcomputer 114 then outputs a command to effect the performance of the operation corresponding to the keypress data $D_{KEY}$.

Thus, as illustrated in FIG. 3, the operation corresponding to the user command $C_{USR}$ is performed within the consumer electronics system 100. Even if the user command $C_{USR}$ is continuously issued, i.e., a function key 18 is continuously depressed, the corresponding operation will be performed without any significant IR jamming problems. Specifically, and with further reference to FIG. 10, a primary signal $S_{MSG1}$ and a secondary signal $S_{MSG2}$ are depicted as being generated and transmitted within the consumer electronics system 100 in response to a continuous function key 18 operation. Waveform 162 represents the continuous depression of the remote function key 18, remaining high as long as the remote function key 18 is depressed. Waveform 164 represents the primary IR signal $S_{MSG1}$, which is transmitted from the remote control 102 in response to the depression of the remote function key 18. As can be seen, the primary IR signal $S_{IR1}$ comprises a series of primary messages $MSG_1$ in the form of data block pairs, the number of which is dictated by the period of time during which the remote function key 18 is continuously depressed. As can be seen, the remote control 102 advantageously interlaces a plurality of predetermined quiescent periods $T_Q$ between the primary messages $MSG_1$. Preferably, the duration of each quiescent period $T_Q$ is at least equal to the sum of the period of silence required for the audio/video device 106 to detect the secondary message $MSG_2$, the duration of the secondary message $MSG_2$, and the period of silence required for the television 104 to detect the primary message $MSG_1$.

Waveform 166 represents the secondary signal $S_{MSG2}$, which is transmitted from the television 104 in response to the detection and interpretation of the primary signal $S_{MSG1}$. The secondary signal $S_{MSG2}$ comprises a series of single secondary messages $MSG_2$, the number of which is dictated by the number of intact primary messages $MSG_1$ within the primary signal $S_{MSG1}$. That is, for each primary message $MSG_1$ detected and interpreted, the television 104 generates a corresponding secondary message $MSG_2$. As can be seen, the secondary messages $MSG_2$ are transmitted during the quiescent periods $T_Q$ incorporated into the primary signal $S_{MSG1}$. The television 104 accomplishes this by counting the predetermined number of data blocks (in this case, two) in each primary message $MSG_1$, and immediately generating the secondary message $MSG_2$ thereafter.

Waveform 168 represents the duration of the performance of the corresponding operation within the audio/video device 106, remaining low until the operation is performed. The performance of the corresponding operation is signified by performance blocks 170, the duration of which can be varied by the manufacturer of the audio/video device 106. Thus, once the secondary message $S_{MSG2}$ is received and detected by the audio/video device 106 without interference by the primary signal $S_{MSG1}$, the corresponding operation can be performed, even if the performance of the operation eventually overlaps with the transmission of the primary signal $S_{MSG1}$. As can be seen, the corresponding operation is performed during the same time frame that the primary signal $S_{MSG1}$ is transmitted, since the primary messages $MSG_1$ and secondary messages $MSG_2$ are not received by the audio/video device 106 at the same time.

Figure 11:
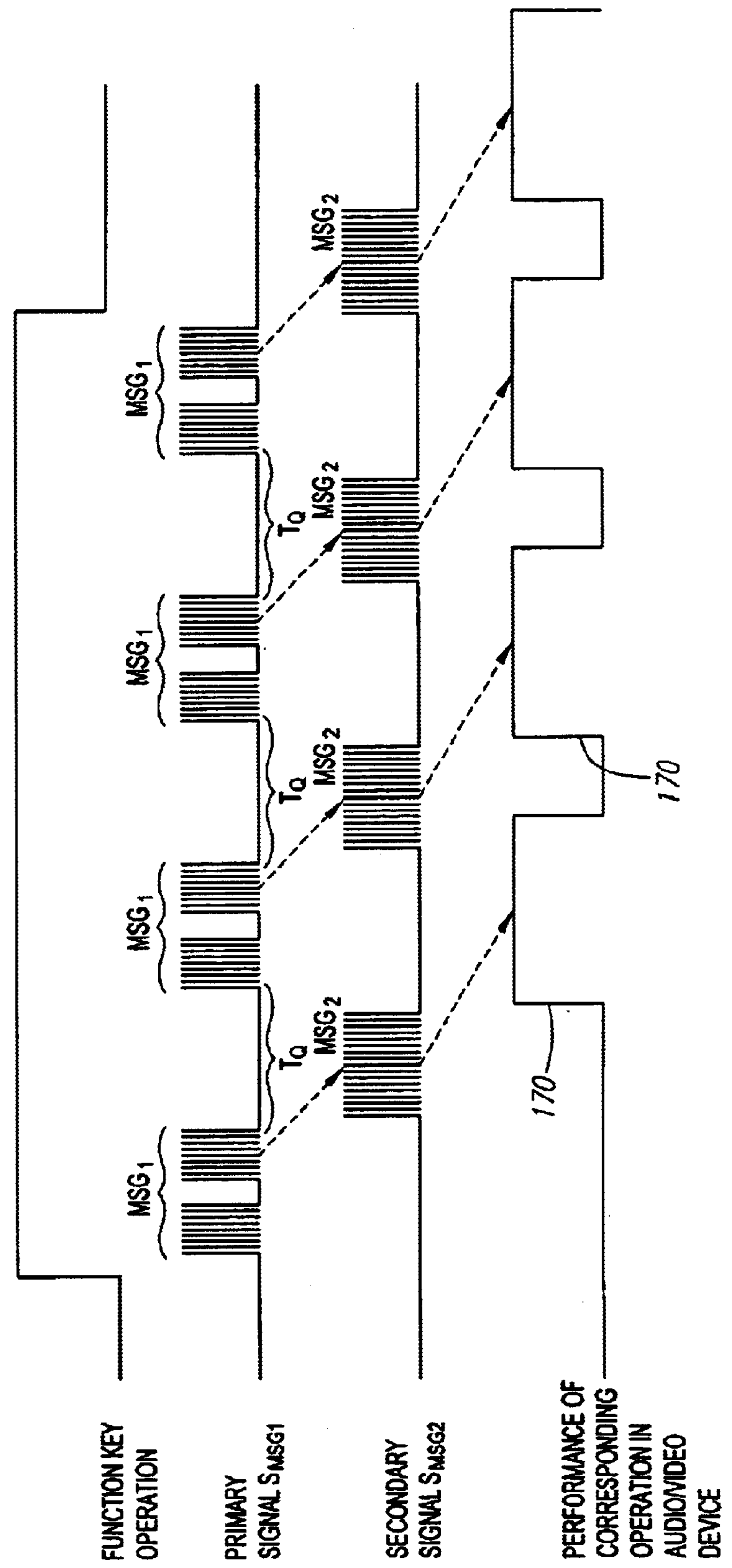
FIG. 11 is another timing diagram illustrating the continuous operation of a remote function key, transmission of primary and secondary signals, and performance of an operation within the audio/video device, wherein signal jamming is avoided and discontinuities within the performance of the operation is minimized.

Because the audio/video device 106 can potentially be fabricated by a variety of manufacturers, the worst case scenerio (i.e., the device that uses the longest message including the period needed to detect the message) should be considered in determining the length of the quiescent periods $T_Q$. Taken the worst case scenario into account, the quiescent period $T_Q$ should be made as short as possible. In this manner, the time needed to effect the operation to the extent desired by the user can be accomplished as quickly as possible. For example, if the operation to be effected is the decreasing of the volume of the audio/video device 106, the user can quickly decrease the volume of the audio/video device 106 to the desired level by continuously depressing the volume-down function key 18. This point is illustrated in FIG. 11, which depicts a primary signal $S_{MSG1}$ with shortened quiescent periods $T_Q$. In comparison with FIG. 10, the shortened quiescent periods $T_Q$ allows the corresponding operation to be more quickly performed, as signified by the increased number of primary messages $MSG_1$, secondary messages $MSG_2$, and performance blocks 170, in response to the function key operation.

For purposes of simplicity, the remote control 102 preferably interlaces quiescent periods $T_Q$ between the primary messages $MSG_1$ of the primary signal $S_{MSG1}$ for all continuously operated function keys 110. Thus, there is no distinction made at the remote control 102 between the operations to be effected in the consumer electronics system 100. The artificial extension of the primary signal $S_{MSG1}$, caused by interlacing quiescent periods $T_Q$ therein, may result in the performance of an uneven operation within the consumer electronics system 100. As described immediately above, this degradation in operation has a direct correlation to the duration of the quiescent periods $T_Q$. That is, the longer the quiescent period $T_Q$, the more discontinuous the performance of the operation will be. This may not create a problem with respect to certain operations, e.g., volume-up, but may create a problem with other operations, e.g., visual-related operations. For example, the visually related operation of moving a picture-in-picture (PIP) image across the screen of the television 104 can appear to be jerky if the quiescent periods $T_Q$ are too long in duration.

Figure 12:
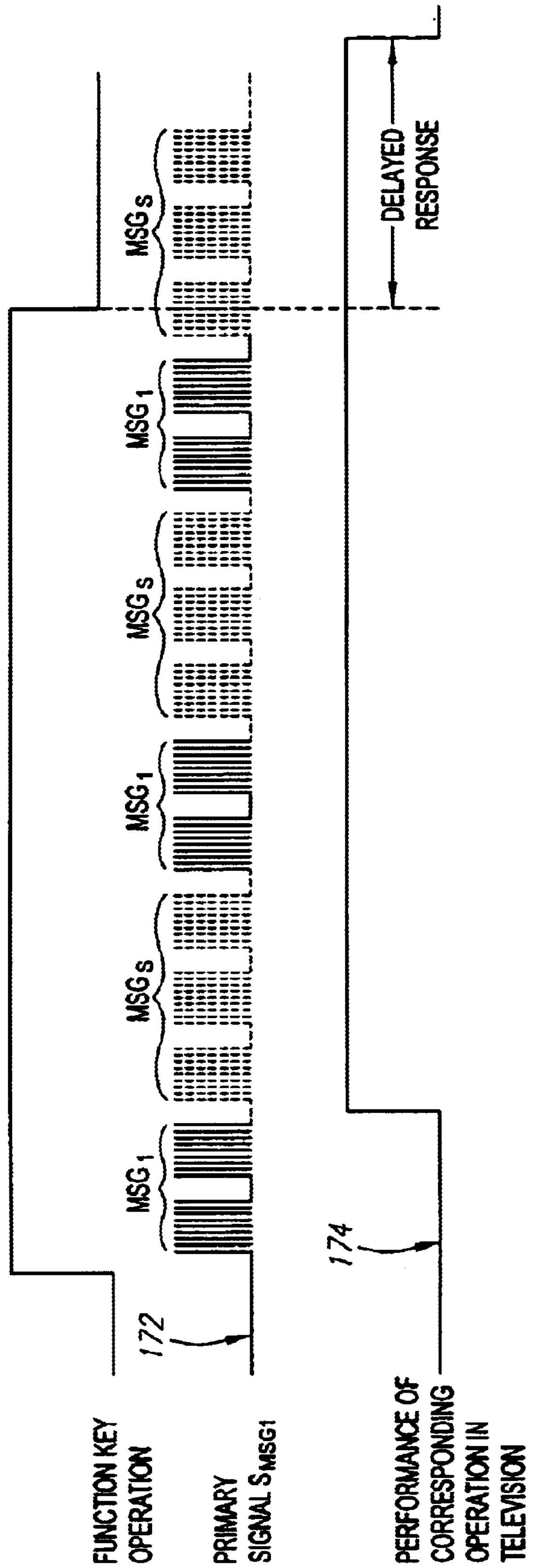
FIG. 12 is another timing diagram illustrating the continuous operation of a remote function key, transmission of a primary signal, and performance of an operation within the interpreting device, wherein discontinuities within the performance of the operation are avoided.

In the case of a television operation, the television 104 can be modified to remedy this potential problem. Referring further to FIG. 12, if the operation to be controlled is visually-related, or would otherwise degrade as a result of the artificially extended primary signal $S_{MSG1}$, the television 104, knowing the length of each $MSG_1$ and the length of each quiescent period $T_Q$, superimposes primary messages $MSG_5$ within the quiescent periods $T_Q$, as shown in waveform 172, i.e., the quiescent periods $T_Q$ are filled with primary messages $MSG_5$ (shown in phantom). If the operation is to be performed in the television 104, the television 104 performs the operation in response to both the actual primary messages $MSG_1$ received and the superimposed primary messages $MSG_5$. Thus, the performance of a particular operation within the television 104 can be made more smooth by configuring the television 104 in the aforementioned manner. This result is illustrated by waveform 174.

Because the television 104, in superimposing primary messages $MSG_1$ within the quiescent periods $T_Q$, does not know when the last primary message $MSG_1$ is transmitted by the remote control 102, the television 104 assumes that a quiescent period $T_Q$ exists after every primary message $MSG_1$ that is received and detected. In this case, the television 104 will superimpose a primary message $MSG_1$ after the last $MSG_1$, as depicted in waveform 172. This typically will result in a delayed response to the release of the corresponding function key 110. For example, if the operation to be performed is a PIP image movement, the PIP image will move slightly after the corresponding function key 110 is released. At worst, this delayed response may be as much as 200 msec. This delay may be acceptable for function key 110 releases. If this is not acceptable, or if the operation to be performed is in the audio/video device 106, the remote control 102 can be designed, such that quiescent periods $T_Q$ are interlaced between $MSG_1$ only in response to the continuous operation of specific function keys 110 that are not delay-sensitive, e.g., volume-up, volume-down, channel-up, channel-down, etc.

While preferred methods and embodiments have been shown and described, it will be apparent to one of ordinary skill in the art that numerous alterations may be made without departing from the spirit or scope of the invention. Therefore, the invention is not to be limited except in accordance with the following claims.

What is claimed is:

1. A method of preventing signal jamming within a consumer electronics system, comprising:

wirelessly transmitting a primary signal comprising first and second messages having a predetermined quiescent period therebetween;

receiving the primary signal;

interpreting the received primary signal;

generating a secondary signal in response to the interpreted primary signal, the secondary signal comprising a third message; and wirelessly transmitting the secondary signal, wherein the entirety of the third message is transmitted during the quiescent period, wherein the quiescent period is at least equal to the sum of the period of silence needed for the audio/video device to detect the third message, the duration of the third message, and the period of silence needed for the interpreting device to detect one of the first or second messages.

2. The method of claim 1, wherein the first and second messages are identical.

3. The method of claim 1, wherein the first, second, and third messages each comprises one or more data blocks.

4. The method of claim 1, wherein the first and second messages each comprises a plurality of data blocks.

5. The method of claim 1, wherein the third message corresponds to the first message.

6. The method of claim 1, wherein the primary and secondary signals comprise IR signals.

7. The method of claim 1, wherein the primary and secondary signals are transmitted at the same frequency.

8. A method of preventing signal jamming within a consumer electronics system, the consumer electronics system comprising a remote control, an interpreting device, and an audio/video device, the method comprising:

continuously operating a remote function key on the remote control;

wirelessly transmitting a plurality of primary messages from the remote control in response to the continuous operation of the remote function key, wherein each of one or more quiescent periods are located between adjacent messages within the plurality of primary messages;

receiving the plurality of primary messages at the interpreting device;

interpreting the received plurality of primary messages;

generating one or more secondary messages in response to the interpreted plurality of primary messages;

wirelessly transmitting the one or more secondary messages from the interpreting device to the audio/video device entirely during the one or more quiescent periods, wherein each quiescent period is at least equal to the sum of the period of silence needed for the audio/video device to detect one of the one or more secondary messages, the duration of one of the one or more secondary messages, and the period of silence needed for the interpreting device to detect one of the plurality of primary messages.

9. The method of claim 8, wherein the plurality of primary messages are identical to each other.

10. The method of claim 8, wherein each message in the plurality of primary messages and the one or more secondary messages comprises one or more data blocks.

11. The method of claim 8, wherein each message in the plurality of primary messages comprises a plurality of data blocks.

12. The method of claim 8, wherein the one or more secondary messages correspond with the plurality of primary messages.

13. The method of claim 8, wherein the interpreting device is implemented in a television.

14. The method of claim 8, wherein the plurality of primary messages and the one or more secondary messages are transmitted on an IR carrier.

15. The method of claim 8, wherein the operation of the remote function key controls a corresponding operation of the audio/video device.

16. The method of claim 8, wherein the one or more quiescent periods are predetermined.

17. The method of claim 8, wherein the plurality of primary messages are formatted in accordance with a first protocol, and the one or more secondary messages are formatted in accordance with a second protocol different from the first protocol.

18. An interpreting device for use in a consumer electronics system, comprising:

a receiver for receiving a wirelessly transmitted primary signal, the primary signal comprising first and second messages with a predetermined quiescent period therebetween;

processing circuitry coupled to the receiver for interpreting the first message and generating a third message in response thereto; and a transmitter coupled to the processing circuitry for wirelessly transmitting the third message within a secondary signal, wherein the entirety of the third message is transmitted during the quiescent period, wherein the quiescent period is at least equal to the sum of the period of silence needed for the audio/video device to detect the third message, the duration of the third message, and the period of silence needed for the interpreting device to detect one of the first or second messages.

19. The interpreting device of claim 18, wherein the receiver comprises an IR sensor, and the transmitter comprises an IR light emitting diode.

20. The interpreting device of claim 18, wherein the processing circuitry comprises a microcomputer.

21. The interpreting device of claim 18, wherein the first and second messages are identical.

22. The audio/video device of claim 18, wherein the first and second messages are formatted in accordance with a first protocol, and the third message is formatted in accordance with a second protocol different from the first protocol.

23. A consumer electronics system, comprising:

a remote control comprising:

a function key for effecting a corresponding operation of the consumer electronics system;

a first processing circuit coupled to a function key, and configured for generating a plurality of primary messages in response to a continuous operation of the function key, wherein each of one or more quiescent periods are located between adjacent messages within the plurality of primary messages; and a first transmitter coupled to the first processing circuit for wirelessly transmitting the plurality of primary messages; and an interpreting device comprising:

a first receiver for receiving the wirelessly transmitted plurality of primary messages;

a second processing circuit coupled to the receiver for interpreting the received plurality of primary messages and generating one or more secondary messages in response thereto; and a second transmitter coupled to the second processing circuit for wirelessly transmitting the one or more secondary messages entirely in the one or more quiescent periods, wherein each quiescent period is at least equal to the sum of the period of silence needed for the audio/video device to detect one of the one or more secondary messages, the duration of one of the one or more secondary messages, and the period of silence needed for the interpreting device to detect one of the plurality of primary messages.

24. The consumer electronics system of claim 23, further comprising:

an audio/video device, wherein the corresponding operation is located therein, the audio/video device comprising:

a second receiver for receiving the wirelessly transmitted one or more secondary messages; and a third processing circuit coupled to the second receiver for interpreting the received one or more secondary messages and generating one or more control signals in response thereto for controlling the corresponding operation.

25. The consumer electronics system of claim 24, wherein the audio/video device is an audio processor.

26. The consumer electronics system of claim 23, wherein the first and second transmitters each comprises an IR light emitting diode, and the first receiver comprises an IR sensor.

27. The consumer electronics system of claim 23, wherein the first and second processing circuits each comprises a microcomputer.

28. The consumer electronics system of claim 23, wherein the interpreting device is implemented within a television.

29. The consumer electronics system of claim 23, wherein the one or more quiescent periods are predetermined.

* * * * *